United States Patent [19]

Glass

[11] 3,743,374

[45] July 3, 1973

[54] STORAGE HOUSING FOR CASES WITH HINGED COVERS

[75] Inventor: Henry G. Glass, Roanoke, Va.

[73] Assignee: Eli Lilly and Company, Indianapolis, Ind.

[22] Filed: Mar. 1, 1972

[21] Appl. No.: 230,830

[52] U.S. Cl. .......... 312/319, 206/1 R, 206/DIG. 36, 312/10, 312/73, 312/285

[51] Int. Cl. A45b 81/06, A45b 88/18, A45c 11/00, A47f 1/06, B65d 83/00, G11b 1/00

[58] Field of Search ................ 206/1 R, 41 D, 41 R, 206/DIG. 36, 41.2 R, 52 F; 312/319, 10, 20, 285, 73

[56] References Cited

UNITED STATES PATENTS

| | | | |
|---|---|---|---|
| 1,763,724 | 6/1930 | Rosenthal | 312/319 |
| 2,199,664 | 5/1940 | Horsley | 312/319 |
| 2,240,215 | 4/1941 | Hutchinson | 312/73 |
| 2,528,743 | 11/1950 | Eggebrecht | 206/41.2 R |
| 2,671,709 | 3/1954 | Radzyner | 312/319 |
| 3,272,325 | 9/1966 | Schoenmakers | 206/DIG. 36 |
| 3,532,211 | 10/1970 | Gellert | 206/1 R |

*Primary Examiner*—William T. Dixson, Jr.
*Attorney*—Everet F. Smith and Houston L. Swenson

[57] ABSTRACT

A storage housing is provided for cases with hinged covers whereby a camming means provided therebetween effects pivotal opening of the case lid upon transmittal of a com-pressive force on the case without removing it from the housing.

6 Claims, 11 Drawing Figures

STORAGE HOUSING FOR CASES WITH HINGED COVERS

BACKGROUND OF THE INVENTION

In the field of magnetic tape recording the use of cassettes containing magnetic tape has become increasingly popular. The design of these cassettes and their cases has become substantially standardized and the particular construction of them is disclosed in U.S. Pat. No. 3,272,325.

With the increased use of cassettes and storage cases various means have been devised for storing a plurality of such cases and cassettes. Primarily these have been conventional designs utilizing shelves and partitions which store the cases in a manner not unlike books. Although such storage housings have been generally satisfactory in order to take a cassette and insert it into a tape player machine one must first remove the case containing the cassette from its housing and then remove the cassette from the case. Although such inconveniences may be considered minor inasmuch as they have been put up with for many years in the record industry where one must first remove the album from a console or other housing and then remove the record from the album cover the inventor believes that with cassettes this operation can be substantially simplified.

SUMMARY OF THE INVENTION

My invention provides a housing or support means for a number of cassette cases whereby an individual cassette can be removed from its case without taking the case from its housing. From an aesthetic standpoint the housing of my invention can be formed in a manner similar to existing ones. In particular my housing can store cases in their upright positions or in trays for horizontal positions. Thus, cases may be stored in a manner similar to books or in a lazy susan fashion or in trays.

In general this ease of removing and replacing a cassette is accomplished by providing a cam means between the rear wall of the cassette case and the supporting surface of the housing. The cam means which comprises a protuberance such as a right triangle effects pivotal opening of the case's lid upon the transmittal of a compressive force on the rear wall of the lid and the camming means. Thus, one need merely press downwardly on the front wall of the cassette case and its hinged cover will spring open to expose the contents therein which in the particular instance is a tape cassette. It is of course to be understood that although the following description is directed to the use of a tape cassette and a specifically designed case that the invention described herein is applicable to other type of cases having hinged covers designed for containing articles in addition to tape cassettes.

DESCRIPTION OF THE DRAWING

FIG. 9 is another embodiment illustrating a cassette case utilizing the camming means affixed thereto rather than on the housing; and FIGS. 9, 9*a* and 9*b* illustrate an embodiment of my invention as applied to a cassette case.

DETAILED DESCRIPTION OF THE PREFERRED EMBODIMENTS

Figures 1, 2, 3, 4, 5, 6:
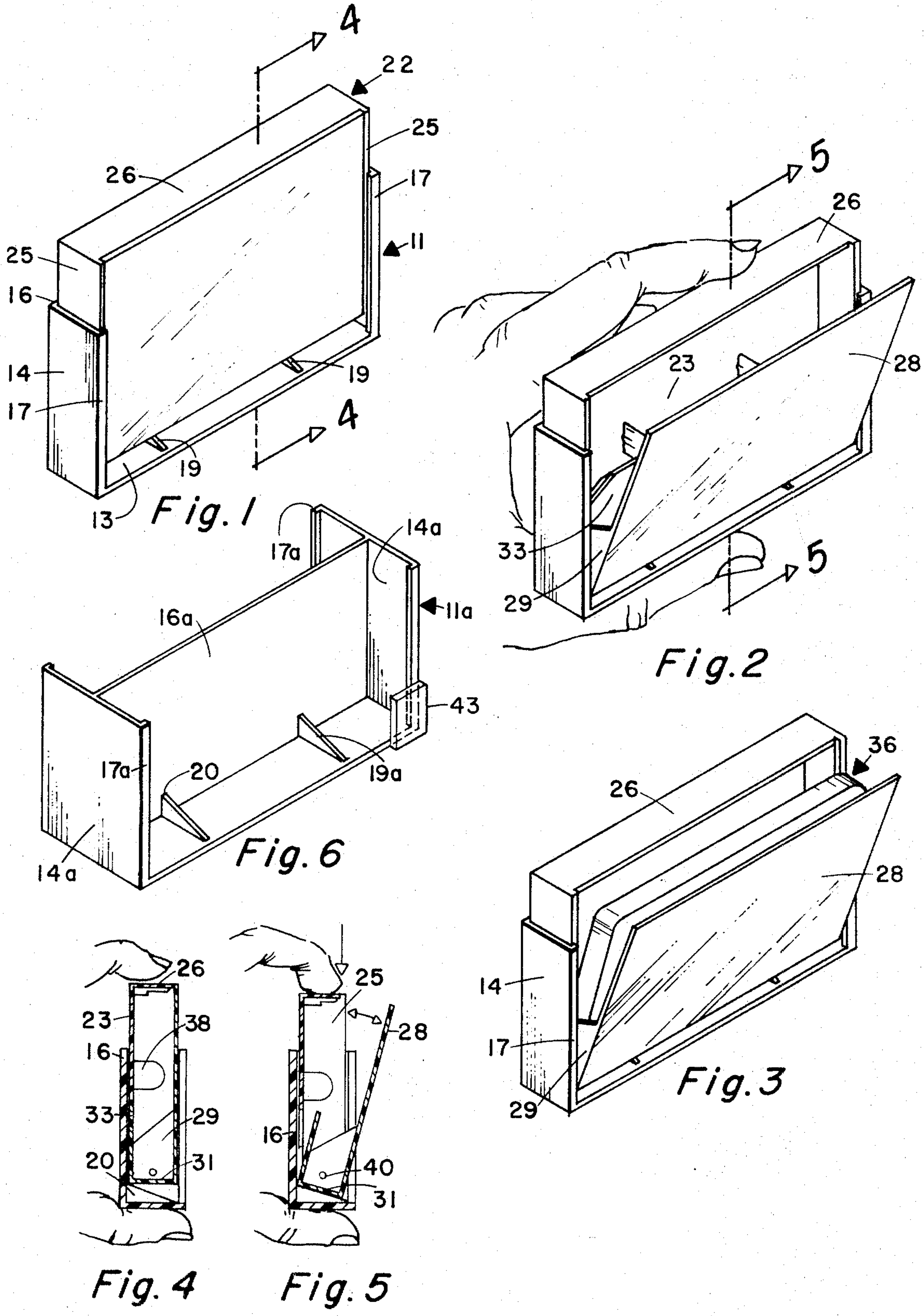
FIG. 1 is a simplified illustration in perspective of a housing containing my invention in combination with a case.
FIG. 2 illustrates how a compressive force applied on the case and housing actuates the case's lid.
FIG. 3 is a perspective view of the housing and case of FIGS. 1 and 2 illustrating how a cassette is exposed upon opening of the case.
FIG. 4 is a view in cross section taken along line 4—4 of FIG. 1.
FIG. 5 is a view in cross section taken along line 5—5 of FIG. 2.
FIG. 6 is a perspective view of a tandem arrangement of a housing embodying my invention.

Referring to FIGS. 1 through 5 a housing embodying my invention is illustrated which can be made from a variety of materials including sheet metal and plastic. Housing 11 has a bottom supporting surface 13 with a pair of upright end walls 14 extending therefrom and a back wall 16. Extending from the front edges of the upright end walls are a pair of flanges or retaining means 17. Integrally formed on the bottom supporting surface 13 are a pair of camming means 19 which in the particular embodiment comprise right angle triangles.

Cassette case 22, which comprises two parts, has a rectangular base wall 23 connected to a pair of upright side walls 25 and a front wall 26. The second element of the case comprises a complementary rectangular lid wall 28 with a pair of depending side walls 29 connected by a base wall 31 (FIGS. 4 and 5). The lid side walls 29 are pivetably connected to the base side walls 25. In the particular illustration base wall 23 is segmented for a complementary fitting with a similarly segmented base wall 33 extending from the lid's rear wall 31. Thus a pouch is defined by lid walls 28, 29, 31 and 33 to contain a cassette therein. A more detailed description of this particular design of cassette case may be obtained from U.S. Pat. No. 3,272,325.

The tape cassette 36 (FIG. 3) which may also be more fully understood by referring to U.S. Pat. No. 3,272,325 contains a pair of reels (not shown) having openings which lock onto lugs 38 fixed to base wall 23 of the cassette case to prevent unwanted tape slippage between the reels. Inasmuch as cassette 36 is carried between the case lid wall 28 and its rear wall 31 opening of the case will cause the cassette to become disengaged from lugs 38.

As shown in FIGS. 4 and 5 the lid's rear wall 31 is seated on the highest points 20 of the camming means 19. The case is maintained in this position by the retaining elements or flanges 17 which overlap only the edges of the upright side walls 25, leaving cover 28 free to pivot outwardly as illustrated in FIG. 2. Referring to FIG. 4 the camming triangle 19 has its highest point 20 in contact with the case's rear wall 31 between back wall 16 of housing 11 and the axis of the pivotal connection 40 connecting the side walls 29 of the lid with the upright side walls 25. Thus a compressive force which may be obtained from pushing downwardly on the front wall 26 of the case causes the rear wall 31 of the case to assume an adjacent or contiguous position with the hypotenuse of camming means 19. However, the base wall 23 of the case and its associated walls are moved only in a direction parallel to the compressive force and toward the bottom supporting surface 13 since the retaining flanges 17 prevent this portion of the case from moving outwardly. Thus, the result of this is uniplanar movement of the base wall 23 whereas the base wall 33 of the lid assumes an angular position to cause the lid wall 28 to also extend outwardly in an angular fashion and thereby move the cassette outwardly to assume a similar angular position as shown in FIG. 3. In such a manner the cassette is now sufficiently exposed for easy removal inasmuch as it has become disengaged with the locking lugs 38 on the case base wall 23. To close the case the sequence is reversed in that the lid wall 28 is merely pushed toward the base wall 23 to assume its original position as shown in FIG. 1. Despite the fact that the cassette case is making only point contact on the camming means 19 it maintains a stable condition in its stored position since the flanges 17 prevent it from leaning outwardly.

The foregoing description has been directed primarily to the general concept of my invention. Referring to FIG. 6 this concept has been utilized in tandem fashion housing whereby back wall **16*a* serves dual purposes and is flanked by two sets of camming triangles 19*a*, of which only one pair is visible in this view. An additional element in the form of a stop 43 is provided to prevent an accidental full opening of cassette case cover 28 and discharge of the cassette therein. In the particular cassette design, cover 28 would open to a horizontal position without stop 43 and, consequently, an accidental dropping of housing 11a would discharge the cassette. Stop 43 can also be provided on both sides 14*a* of the housing or extend across the full width of the housing without interruption. This feature may also be provided on the housings of FIGS. 1–5 and 7. In all other respects this housing is similar to the one shown in FIGS. 1 through 5 including the use of the retaining flanges 17*a*.**

Figure 7:
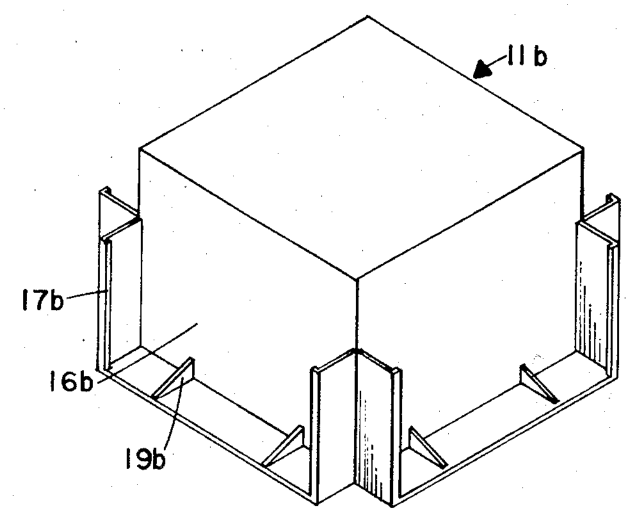
FIG. 7 is a further embodiment of my invention whereby four cases may be arranged in a lazy susan fashion.

The illustration of FIG. 7 shows how my invention can be embodied in a cube arrangement whereby four cassettes are stored in housing **11*b*. Attention is directed to the use of similar camming triangles 19*b* which abut against their respective back wall 16*b*.**

Figure 8:
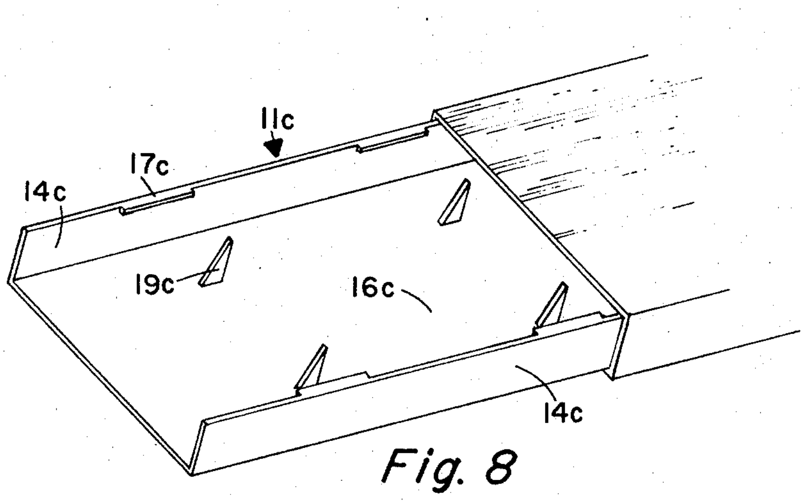
FIG. 8 is a still further embodiment of my invention illustrating a housing comprising one or more trays.

In FIG. 8 an illustration of my invention is rotated 90° in a horizontal fashion whereby one or more trays may be used as housings for the cassette cases. Thus tray **11*c* comprises a rectangular wall 16*c* flanked by a pair of end walls 14*c*. Extending from walls 14*c* are one or more pairs of retaining flanges 17*c* which again are dimensioned to overlap only the top edges of the cassette case walls 25. Likewise one or more pairs of camming triangles 19*c* are provided. In this design of my housing the cassette cases are stored in a horizontal fashion with their rear walls 31 again butted against extensions 20*c* of camming means 19*c*. Opening and closing of the case is similar to the operation described for FIGS. 1 through 5.**

Figures 9, 9A, 9B:
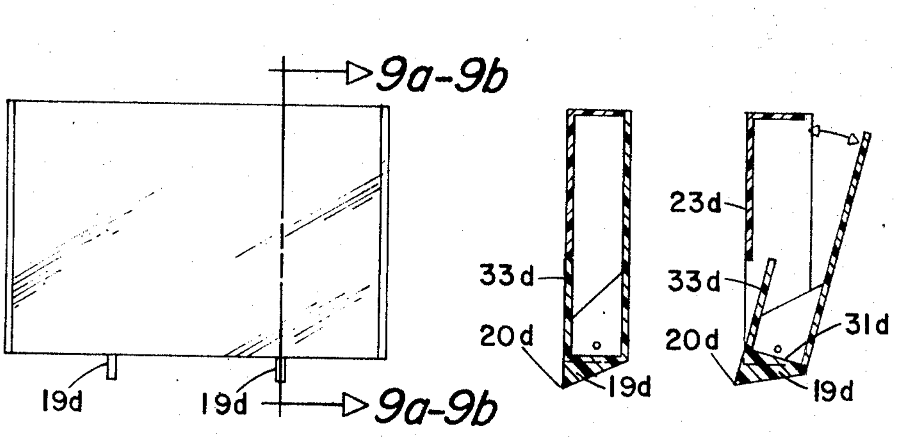

The embodiment of my invention shown in FIGS. **9, 9*a*, and 9b is similar to that of FIGS. 1 through 5 except that the two camming triangles 19*d* are affixed to the rear wall 31d of the cassette case. The unillustrated housing may be similar to that of FIGS. 1 through 5 including the use of retaining flanges 17. Attention is directed to the fact that the camming means 19*d* again have their greatest extension 20*d* in contact with the case's rear wall 31 at a point between the axis of the pivotal connection of the case and the back wall 16 of the housing. In FIG. 9*b* it is noted that peaks 20*d* of triangles 19*d* tilt to a position extending beyond the plane of base wall 23*d*. Thus, to cope with this extension the back wall 16 of housing 11 (FIG. 1**) may be formed with a pair of openings.

I claim:

1. In the combination of a housing and a case, said case having a rectangular base wall with a pair of upright side walls connected by a front wall and a complementary lid wall with a pair of downwardly depending side walls connected by a rear wall, said lid side walls being pivotably connected to said base side walls, the improvement comprising, a camming means disposed against said lid rear wall and adjacent a back wall of said housing, said camming means effecting pivotal opening of said storage case lid upon transmitting a compressive force on said camming means and said lid rear wall.

2. The improvement of claim 1 in which said camming means comprises a protuberance having its greatest extension contacting said lid rear wall at a point between the axis of said pivotal connection and said housing back wall.

3. The improvement of claim 2 in which said housing has a retaining means limiting movement of said case's rectangular base wall and its associated front wall and side walls to uni-planar movement parallel to said compressive force.

4. The improvement of claim 3 in which said retaining means comprises a linear element slidably engaged with said base side walls.

5. The improvement of claim 4 in which said linear element is a flange mounted on said housing and overlapping the unconnected edges of said base side walls.

6. The improvement of claim 1 in which said camming means comprises a right triangular element having its base line extending from the lower edge of said lid rear wall.

* * * * *